(12) United States Patent
Rogala et al.

(10) Patent No.: US 12,259,277 B2
(45) Date of Patent: Mar. 25, 2025

(54) IMAGE POLARIMETER USING A MICRO-ELECTRO-MECHANICAL SYSTEM (MEMS) MICRO-MIRROR ARRAY (MMA)

(71) Applicant: Raytheon Company, Arlington, VA (US)

(72) Inventors: Eric Rogala, Tucson, AZ (US); Gerald P. Uyeno, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 768 days.

(21) Appl. No.: 17/479,927

(22) Filed: Sep. 20, 2021

(65) Prior Publication Data

US 2024/0402016 A1    Dec. 5, 2024

(51) Int. Cl.
*G01J 4/04*    (2006.01)
*G02B 26/08*   (2006.01)
*G02B 27/28*   (2006.01)

(52) U.S. Cl.
CPC ............ *G01J 4/04* (2013.01); *G02B 26/0833* (2013.01); *G02B 27/286* (2013.01)

(58) Field of Classification Search
CPC ...... G01J 4/04; G02B 26/0833; G02B 27/286
USPC .................................................. 356/366, 367
See application file for complete search history.

(56) References Cited

U.S. PATENT DOCUMENTS

| | | |
|---|---|---|
| 5,404,375 A | 4/1995 | Kroeger et al. |
| 5,854,702 A | 12/1998 | Ishikawa et al. |
| 6,181,450 B1 | 1/2001 | Dishman et al. |
| 6,271,953 B1 | 8/2001 | Dishman et al. |
| 6,327,063 B1 | 12/2001 | Rockwell |
| 6,567,574 B1 | 5/2003 | Ma et al. |
| 7,593,641 B2 | 9/2009 | Tegge, Jr. |
| 7,660,235 B2 | 2/2010 | Alicherry et al. |
| 8,301,027 B2 | 10/2012 | Shaw et al. |
| 8,305,578 B1* | 11/2012 | Mudge ...................... G01J 4/04 356/367 |

(Continued)

OTHER PUBLICATIONS

"U.S. Appl. No. 17/007,917, Notice of Allowance mailed Jan. 10, 2022", 14 pgs.

(Continued)

*Primary Examiner* — Roy M Punnoose
(74) *Attorney, Agent, or Firm* — Schwegman Lundberg & Woessner, P.A.

(57) ABSTRACT

An image polarimeter includes a MEMS MMA divided into two or more segments in which the mirrors in each segment are provided with a polarizer of a given polarization. The mirrors in each segment are tipped and tilted to steer polarized light onto different portions of an optical detector. In certain configurations the mirrors may also be pistoned to reduce aberrations. Each frame that is read out from the detector includes two or more distinct component polarized images having different polarizations P0, P2, . . . of the same scene to fully characterize the polarization properties of the scene. Since the mirrors only tip/tilt/piston in the dead period between frames, no components are moving during image acquisition and co-registration of the component polarized images is simple. The number of segments and the different polarizations may be selected to implement Jones calculus, Mueller calculus and Stokes parameters or other polarimetry techniques.

20 Claims, 6 Drawing Sheets

(56) References Cited

U.S. PATENT DOCUMENTS

| | | | |
|---|---|---|---|
| 8,368,889 B2* | 2/2013 | Schwiegerling | G01J 4/04 356/367 |
| 8,823,848 B2* | 9/2014 | Chipman | G01J 4/04 359/437 |
| 8,983,293 B2 | 3/2015 | Frankel et al. | |
| 9,473,768 B2 | 10/2016 | Uyeno et al. | |
| 9,477,135 B1 | 10/2016 | Uyeno et al. | |
| 9,857,226 B2* | 1/2018 | LeMaster | G02B 5/201 |
| 10,243,654 B1* | 3/2019 | Uyeno | H04B 7/18521 |
| 10,444,492 B2* | 10/2019 | Hopkins | F41H 13/0062 |
| 10,718,491 B1 | 7/2020 | Raring et al. | |
| 10,969,598 B2 | 4/2021 | Fest et al. | |
| 10,998,965 B2 | 5/2021 | Tong et al. | |
| 11,042,025 B2 | 6/2021 | Uyeno et al. | |
| 11,333,879 B2* | 5/2022 | Uyeno | H04B 10/50 |
| 11,815,676 B2* | 11/2023 | Uyeno | G02B 26/101 |
| 2002/0141689 A1 | 10/2002 | Qian et al. | |
| 2002/0196506 A1 | 12/2002 | Graves et al. | |
| 2003/0081321 A1 | 5/2003 | Moon et al. | |
| 2003/0185488 A1 | 10/2003 | Blumenthal | |
| 2004/0072540 A1 | 4/2004 | Wilson et al. | |
| 2004/0081466 A1 | 4/2004 | Walther et al. | |
| 2004/0141752 A1 | 7/2004 | Shelton et al. | |
| 2004/0258415 A1 | 12/2004 | Boone et al. | |
| 2005/0031255 A1 | 2/2005 | Schroeder et al. | |
| 2005/0100339 A1 | 5/2005 | Tegge | |
| 2005/0122566 A1 | 6/2005 | Cicchiello | |
| 2005/0288031 A1 | 12/2005 | Davis et al. | |
| 2006/0038103 A1 | 2/2006 | Helmbrecht | |
| 2007/0031157 A1 | 2/2007 | Yamada et al. | |
| 2007/0036480 A1 | 2/2007 | Wu | |
| 2008/0050064 A1 | 2/2008 | Sakai et al. | |
| 2010/0149533 A1 | 6/2010 | Fest | |
| 2010/0166430 A1 | 7/2010 | Alten | |
| 2012/0002973 A1 | 1/2012 | Bruzzi et al. | |
| 2012/0008133 A1 | 1/2012 | Silny et al. | |
| 2012/0114337 A1 | 5/2012 | Aoki | |
| 2012/0155885 A1 | 6/2012 | Hannah et al. | |
| 2012/0168605 A1* | 7/2012 | Milanovic | G01B 11/002 250/203.1 |
| 2013/0271818 A1 | 10/2013 | Bastien | |
| 2014/0063299 A1* | 3/2014 | Fest | G01J 3/513 348/E5.091 |
| 2015/0099476 A1 | 4/2015 | Beals | |
| 2015/0172218 A1 | 6/2015 | Beshai | |
| 2015/0311981 A1 | 10/2015 | Inagaki et al. | |
| 2015/0378242 A1 | 12/2015 | Auxier et al. | |
| 2016/0003677 A1 | 1/2016 | Pezzaniti et al. | |
| 2016/0043800 A1* | 2/2016 | Kingsbury | H04B 7/18513 398/125 |
| 2016/0234703 A1 | 8/2016 | Aldana et al. | |
| 2016/0294472 A1 | 10/2016 | Palmer et al. | |
| 2017/0293137 A1 | 10/2017 | Zhao et al. | |
| 2018/0231715 A1 | 8/2018 | Bishop et al. | |
| 2019/0066320 A1 | 2/2019 | Uyeno et al. | |
| 2019/0154921 A1 | 5/2019 | Xing et al. | |
| 2020/0244359 A1 | 7/2020 | Csonka et al. | |
| 2021/0088776 A1 | 3/2021 | Uyeno et al. | |
| 2021/0091854 A1* | 3/2021 | Uyeno | H04B 10/66 |
| 2021/0092260 A1 | 3/2021 | Uyeno et al. | |

OTHER PUBLICATIONS

"U.S. Appl. No. 17/007,917, Supplemental Notice of Allowability mailed Apr. 19, 2022", 2 pgs.

"U.S. Appl. No. 16/871,602, Non Final Office Action mailed Nov. 9, 2020", 18 pgs.

"U.S. Appl. No. 16/871,602, Notice of Allowance mailed Feb. 24, 2021", 5 pgs.

"U.S. Appl. No. 16/871,602, Response filed Feb. 8, 2021 to Non Final Office Action mailed Nov. 9, 2020", 12 pgs.

"U.S. Appl. No. 17/007,917, Non Final Office Action mailed Aug. 3, 2021", 35 pgs.

"U.S. Appl. No. 17/007,917, Response filed Dec. 1, 2021 to Non Final Office Action mailed Aug. 3, 2021", 16 pgs.

"Mirrorcle Technologies MEMS Mirrors—Technical Overview", Mirrorcle Technologies, Inc., (2018), 7 pgs.

Kim, et al., "Demonstration of large-angle nonmechanical laser beam steering based on LC polymer polarization grating", Proc. of SPIE vol. 8052 80520T, (May 13, 2011), 13 pgs.

"High Contrast IR Wire Grid Polarizers", Edmund Optics, [Online]. Retrieved from the Internet: <URL: https://www.edmundoptics.com/f/high-contrast-ir-wire-grid-polarizers/14797/>, (Accessed Sep. 4, 2021), 1 pg.

"Mid-Wave Infrared (MWIR) and Long-Wave Infrared (LWIF) Waveplates", Edmund Optics, [Online]. Retrieved from the Internet: <URL: https://www.edmundoptics.com/f/mid-wave-infrared-mwir-and-long-wave-infrared-lwir-waveplates/14317/>, (Accessed Sep. 4, 2021), 2 pgs.

U.S. Appl. No. 17/007,917, filed Aug. 31, 2020, Electronically Steered Inter-Satellite Optical Communication System With Micro-Electromechanical (MEM) Micromirror Array (MMA).

"MEMS Mirror Array—Beam Steering Mode", [Online]. Retrieved from the Internet: <www.youtube.com/watch?v=wHIUU3kKtzM>, (Aug. 10, 2017), 2 pgs.

Rodriguez, et al., "Beam steering by digital micro-mirror device for multi-beam and single-chip lidar", Proc. SPIE 10757, Optical Data Storage 2018: Industrial Optical Devices and Systems, (Sep. 14, 2018), 7 pgs.

Ryf, et al., "MEMS tip/tilt and piston mirror arrays as diffractive optical elements", Proc. SPIE 5894, Advanced Wavefront Control: Methods, Devices, and Applications III, (Aug. 30, 2005), 12 pgs.

Tsou, et al., "Extended-image spatial tracking technique for deep-space optical downlinks", Proc. SPIE 3762, Adaptive Optics Systems and Technology, (Sep. 27, 1999), 101-109.

Tuantranont, et al., "Optical beam steering using MEMS-controllable microlens array", Sensors and Actuators A: Physical vol. 91, Issue 3, (Jul. 15, 2001), 363-372.

* cited by examiner

IMAGE POLARIMETER USING A MICRO-ELECTRO-MECHANICAL SYSTEM (MEMS) MICRO-MIRROR ARRAY (MMA)

BACKGROUND OF THE INVENTION

Field of the Invention

This invention relates to image polarimeters to analyze polarization components of light, and more specifically to the use of a Micro-Electro-Mechanical System (MEMS) Micro-Mirror Array (MMA) to form the image polarimeter.

Description of the Related Art

Imaging detectors, such as focal plane arrays, generally include an array of pixels, each pixel including a photo-detector that generates a signal responsive to light generated or reflected by an object. These signals are collected and combined such that a digital image of the object can be created and read out as a sequence of frames. Filter arrays are widely used in commercial imaging systems to provide hyperspectral or polarimetric capability. For example, digital cameras use fixed-in-place pixelated filter arrays or color wheels for color (RGB) photography. These filters reduce the amount of light that reaches the imaging pixel (for example, a red filter reflects blue and green light). Polarimeters can be used to analyze two or more polarization components of light. A partial list of techniques for polarimetry includes Jones calculus, Mueller calculus and Stokes parameters.

Stokes parameters are a set of values that have been utilized to describe a polarization state of light. In particular, Stokes parameters describe light in terms of total intensity (I), a fractional degree of polarization (p) and shape parameters of a polarization ellipse. As shown in FIG. 1A, the standard approach is to use four polarizers 10 having angular values of $\Theta_1=0°$, $\Theta_2=45°$, $\Theta_3=90°$ and $\Theta_4=45°$ QWP, respectively, where "QWP" is a quarter wave plate that rotates the phase by a quarter wave.

The images associated with each are $I_0$, $I_{45}$, $I_{90}$ and $I_{45QWP}$. The Stokes parameters are given as follows:

$$S0 = I_0 + I_{90},$$

$$S1 = I_0 - I_{90},$$

$$S2 = 2 * I_{45} - I_0 - I_{90}, \text{ and}$$

$$S3 = 2 * I_{45QWP} - I_0 - I_{90}.$$

Other polarizations for the four polarizers than the standard 0/45/90/45QWP are possible but would require a different set of equations to compute the Stokes parameters. Other sets of polarizations would be equivalent to the standard values for which the equations are well known.

As shown in FIG. 1B, the Stokes parameters can be used to describe the degree of polarization for any state of polarization (completely polarized, partially polarized, and unpolarized) as depicted in polarized image 12.

The Degree of Polarization DOP is defined as (based on light intensity):

$$DOP = \frac{I_{pol}}{I_{Total}} = \frac{\sqrt{S_1^2 + S_2^2 + S_3^2}}{S_0}$$

where $I_{pol}$ is the intensity of the sum of the polarization components, and $I_{tot}$ is the total intensity of the beam.

Similarly, we can define the Degree of Linear Polarization, DOLP as $$DOLP = \frac{I_{Linpol}}{I_{Total}} = \frac{\sqrt{S_1^2 + S_2^2}}{S_0}$$

where $I_{linpol}$ is the intensity of the sum of the linear polarization components, and $I_{tot}$ is the total intensity of the beam.

The Degree of Circular Polarization, DOCP is the ratio of S3 to S0, $$DOCP = \frac{I_{circpol}}{I_{Total}} = \frac{S_3}{S_0}$$

The polarized image 12 may be the DOP, DOLP or the DOCP.

Several other parameters can be derived from Stokes parameters, including ellipticity, eccentricity, azimuth angle and the length of the major and minor axes in a polarization graphical representation.

The component polarized images $I_0$, $I_{45}$, $I_{90}$ and $I_{135}$ can be obtained in different ways. In one approach, axially rotating polarizers and waveplates generate a time-sequence of component polarized images $I_0$, $I_{45}$, $I_{90}$, $I_{45QWP}$, $I_0$, $I_{45}$, $I_{90}$, $I_{45QWP}$ .... Each batch of component polarized images must be co-registered to account for any time-varying changes to the optical system such as jitter. Furthermore, this approach requires motors to rotate the polarizers and waveplates, which require volume and prevent compact packaging of the imaging system. In another approach, a 2×2 filter having linear polarizers having angular values of $\Theta_1=0°$, $\Theta_2=45°$, $\Theta_3=90°$ and $\Theta_4=45°$ QWP, respectively, can be placed just in front of or integrated onto the FPA. The linear polarizers may be dielectric coatings. The QWP may be a discrete waveplate or may be integrated with the linear polarizer coating as a birefringent material of a specified thickness, a dielectric coating or a wire grid. The primary drawback to this approach is that if the existing FPA is replaced with a more recent FPA with higher resolution, smaller pixels etc. either the filter in front of the FPA has to be replaced or the new FPA most be fabricated with the requisite polarization coatings.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an image polarimeter in which a MEMS MMA is divided into two or more segments and the mirrors in each segment are provided with a polarizer of a given polarization. The mirrors in each segment are tipped and tilted to steer polarized light onto different portions of an optical detector. In certain configurations the mirrors may also be pistoned to reduce aberrations. Each frame that is read out from the detector includes two or more distinct component polarized images having different polarizations P0, P2, . . . of the same scene to fully characterize the polarization properties of the scene. Since the mirrors only tip/tilt/piston in the dead period between frames, no components are moving during image acquisition and co-registration of the component polarized images is simple.

In an embodiment, an image polarimeter includes an image forming system configured to collect light to form an image of a scene and a Micro-Electro-Mechanical System (MEMS) Micro-Mirror Array (MMA) positioned at or near an aperture stop of the image forming system. The MEMS MMA comprises a plurality of mirrors responsive to command signals to at least tip and tilt about first and second axes, respectively. The MEMS MMA is segmented into two or more segments with each segment including a plurality of mirrors; the mirrors in a given segment having polarizers that impart the same polarization with the polarizers in the two or more segments imparting different polarizations P0, P1, . . . . The MEMS MMA responsive to command signals to tip and tilt the mirrors in the respective segments to reflect and steer polarized light having at least two different polarizations at respective steering angles to respective non-overlapping portions of a pixelated optical detector. A focusing element (e.g. the mirrors themselves or two or more lenses placed after the MEMS MMA) focus the polarized light to form two or more component polarized images I0, I1, . . . of the same image of the scene on the respective portions of the optical detector. A MEMS MMA controller is configured to generate the command signals to drive the MEMS MMA.

The number of segments and the different polarizations may be selected to implement Jones calculus, Mueller calculus and Stokes parameters or other polarimetry techniques. To provide the component polarization images to compute Stokes parameters, the MEMS MMA is segmented into four segments in which the polarizers provide different polarizations P0, P1, P2 and P3 from which the Stokes parameters can be derived. Most commonly, P0=0 degrees, P1=45 degrees, P2=90 degrees and P3=QWP45 degrees.

In an embodiment, the MEM MMA mirrors may also be able to piston in translation along a third axis to provide three degrees-of-freedom (3DOF). In general, piston can be used to reduce aberrations in the component polarized images. More specifically, piston can be used to reduce aberrations caused by discontinuities between adjacent mirrors in given segment that are tipped/tilted at nominally the same steering angle, by discontinuities along a surface of the mirrors in a given segment tipped/tilted to focus the polarized light, or by temporal variations such as atmospheric distortion or thermal heating. A nominal fixed piston contribution can be computed for each mirror in a given segment to reduce aberrations for a fixed steering and or fixed focus.

These and other features and advantages of the invention will be apparent to those skilled in the art from the following detailed description of preferred embodiments, taken together with the accompanying drawings, in which:

DETAILED DESCRIPTION OF THE INVENTION

The present invention provides an image polarimeter in which a MEMS MMA is divided into two or more segments and the mirrors in each segment are provided with a polarizer of a given polarization. The mirrors in each segment are tipped and tilted to steer polarized light onto different portions of an optical detector. In certain configurations the mirrors may also be pistoned to reduce aberrations. Each frame that is read out from the detector includes two or more distinct component polarized images having different polarizations P0, P2, . . . of the same scene to fully characterize the polarization properties of the scene. Since the mirrors only tip/tilt/piston in the dead period between frames, no components are moving during image acquisition and co-registration of the component polarized images is simple. The number of segments and the different polarizations may be selected to implement Jones calculus, Mueller calculus and Stokes parameters or other polarimetry techniques.

Without loss of generality, an embodiment of the image polarimeter in which an MEMS MMA is configured to produce the component polarization images in a single frame will be described to support the computation of Stokes parameters. It is understood that the specific number of segments, hence component polarization images, and the specific polarizations of those images can be readily adapted for other polarimetry techniques including but not limited to Jones calculus and Mueller calculus. The embodiment also includes the mirror "piston" capability, which can be used to reduce aberrations in the component polarization images due to steering or focus artifacts or temporal distortions such as atmospheric distortion or thermal heating. It is understood that such mirror "piston" capability is not required but is an added and beneficial feature of certain MEMS MMA implementations. For simplicity and clarity, the embodiment uses the standard polarization values of 0/45/90/QWP45. It is understood the other polarization values may be used requiring new equations to map the component polarization images to the Stokes parameters but which are equivalent to the standard polarization values.

Figure 2B:
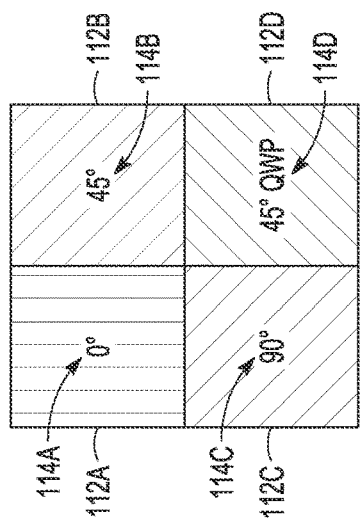
FIGS. 2A and 2B are illustrations of an image polarimeter in which quadrants of a MEMS MMA are provided with polarization coatings and used to steer and focus component polarized images onto respective portions of a focal plane array (FPA)
Figure 2A:
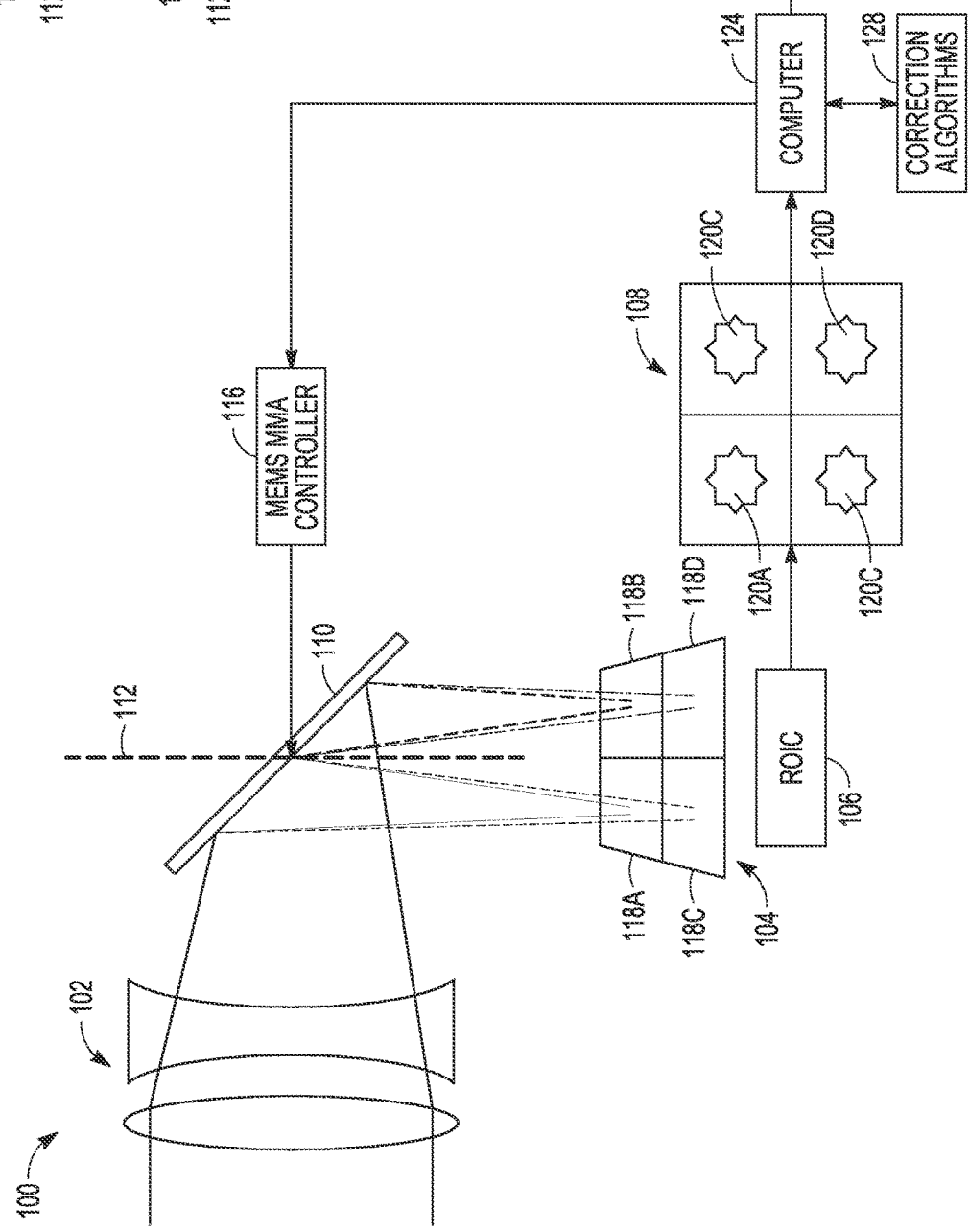

Referring now to FIGS. 2A and 2B, an embodiment of an image polarimeter 100 is configured to produce the four standard component polarization images $I_0$, $I_{45}$, $I_{90}$ and $I_{45QWP}$ used to compute the Stokes parameters S0, S1, S2 and S3 used to describe the degree of polarization in the Degree of Polarization (DOP), Degree of Linear Polarization (DOLLP) and Degree of Circular Polarization (DOCP).

Image polarimeter 100 includes an image forming system 102 configured to collect light to form an image of a scene. A pixelated optical detector 104 such as a focal plane array (FPA) is positioned at or near an image plane of the system. A read out integrated circuit (ROIC) 106, coupled to or integrated with the FPA, reads out an image frame 108 at a frame rate. Each frame includes an imaging period in which to receive and integrate incident photons to form the image and a dead period that effectively separates the frames.

A MEMS MMA 110 is placed at or near (as close as possible) to an aperture stop 112 of the image forming system. All of the light rays collected from the scene crosses at the aperture stop such that each portion of the aperture contains the same image of the scene. MEMS MMA 110 includes a plurality of mirrors responsive to command signals to tip and tilt about first and second axes, respectively, and to piston in translation along a third axis in three degrees-of-freedom (3DOF). The MEMS MMA is segmented (via command signals) into four segments 112a, 112b, 112c and 112d. The segments may be equally dimensioned quadrants of the FPA but that is not required. Each segment includes a plurality of mirrors. The mirrors in a given segment have polarizers that impart the same polarization while mirrors in different segments have polarizers that impart different polarizations. More specifically, the mirrors in segments 112a, 112b, 112c and 112d are provided with polarizers that impart polarizations P0 114a, P1 114b, P2 114c and P3 114d, respectively, equal to 0, 45, 90 and QWP45 degrees, respectively. Depending upon the optical band of interest, the polarizers may be a dielectric coating or a wire grid array configured to impart a linear polarization of a particular angular value. The polarizers and QWP are applied as coatings or embedded into the surface of the mirrors.

A MEMS MMA controller 116 is configured to generate command signals to MEMS MMA 110 to tip and tilt the mirrors in the respective segments to reflect and steer polarized light having polarizations P0, P1, P2 and P3 at respective steering angles to respective non-overlapping portions 118a, 118b, 118c and 118d of FPA 104. Once configured, the steering angles, hence the tip and tilt of the mirrors, for each segment are nominally fixed to direct light from a particular segment of the MEMS MMA to particular portion of the FPA. In this configuration, the mirrors are also tipped and tilted to focus the polarized light from each segment to form the component polarized images $I0=I_0$ 120a, $I1=I_{45}$ 120b, $I2=I_{90}$ 120c and $I3=I_{45QWP}$ 120d. The tip/tilt required to nominally focus the polarized light onto the detector can also be pre-calculated and fixed. Piston can be used to reduce the discontinuities between adjacent mirrors that tip/tilt to steer or focus the polarized light onto the detector. This piston contribution can also be pre-calculated and fixed. The MEMS MMA controller can access a lookup table (LUT) for the command signals to drive tip, tilt and focus to provide the nominal steering angle and focus. To augment the mirror capability to focus the light or to remove focusing from the MMA altogether, four lenses can be placed between the MEMS MMA and the FPA to focus the polarized light onto the respective portions of the FPA.

ROIC 106 reads out an image frame 108 at a frame rate. Each image frame 108 contains the four component polarized images 120a, 120b, 120c and 120d. A single frame fully characterizes the polarization properties needed to compute the Stokes parameters.

A computer 124 processes the four component polarized images 120a, 120b, 120c and 120d to compute DOP, DOLP or DOCP, which can be visualized as a polarimetric image 126. Computer 124 may also be configured to employ a suite of correction algorithms 128 (atmospheric distortion correction, thermal heating) that process the component polarized images 120a, 120b, 120c and 120d to assess the quality of the images e.g. focus, SNR, clarity, etc. and compute a dynamic piston for each mirror in each segment of the MEMS MMA. The tip/tilt values may be adjusted as well but this dynamic aberration correction is typically primarily a piston effect.

The nominal tip/tilt/piston to focus the polarized light and direct that light to the corresponding portion of the FPA is known and fixed. The dynamic component of piston and possibly tip/tilt, is only used to actuate the mirrors in the dead period between frames. As a result, no components are moving during image acquisition and co-registration of the component polarized images is simple. A one-time calibration is sufficient.

Figure 3A:
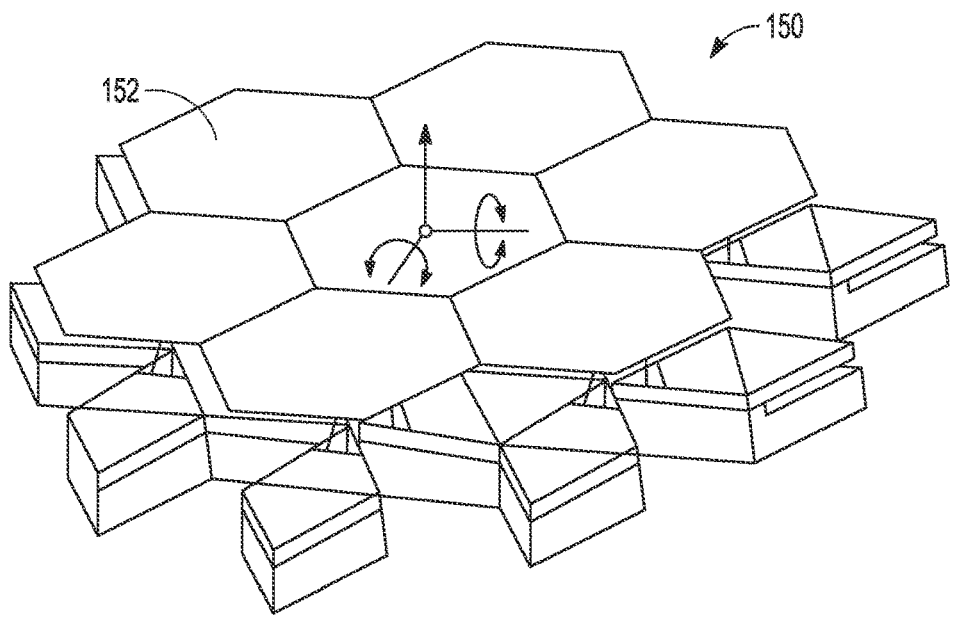
FIGS. 3A and 3B are illustrations of a known embodiment of a Tip/Tilt/Piston ("TTP") MEMS MMA and a single mirror actuated to tip, tilt and piston.
Figure 3B:
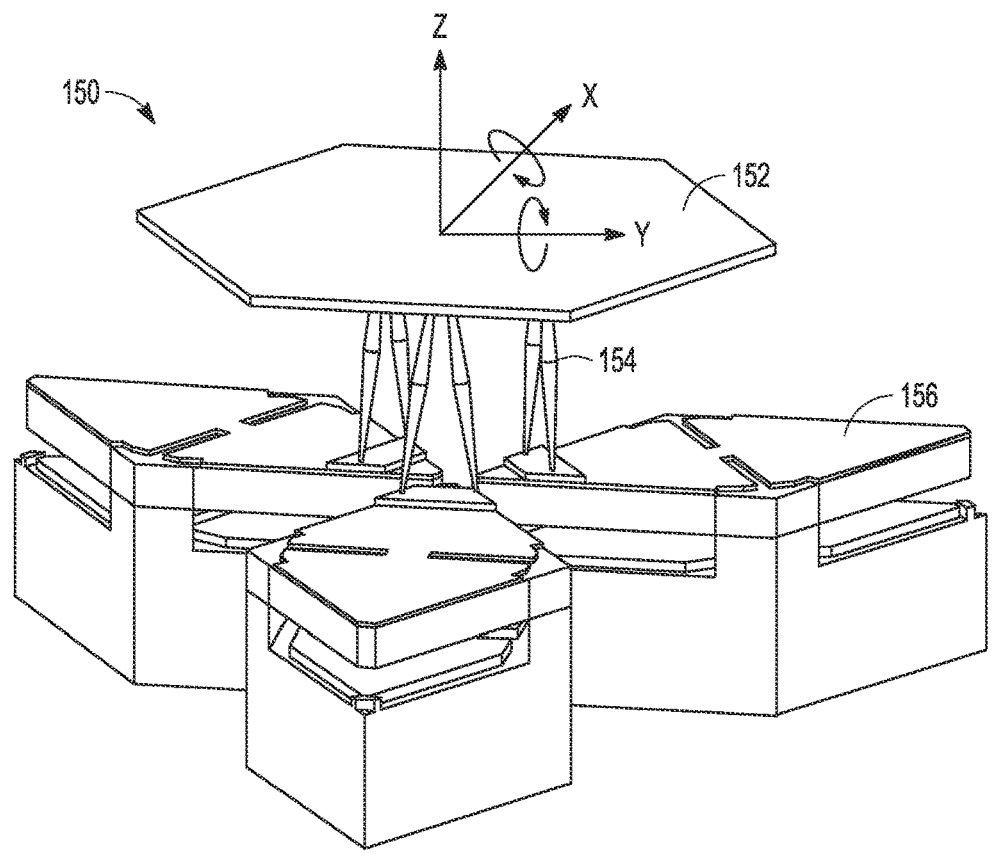

As best shown in FIGS. 3A-3B, an exemplary MEMS MMA 150 comprises a plurality of independently and continuously controllable mirrors 152 to re-direct light in three DOF. Each mirror is capable of at least "Tip" (rotation about an X-axis), "Tilt" (rotation about a Y-axis) and "Piston" (translation along a Z-axis, perpendicular to the XY plane) where the X, Y and Z are orthogonal axes in a three-dimensional space.

The MEMS MMA is preferably capable of tipping and tilting over range of at least $-15°\times+15°$ to steer over a range of $+/-30°\times30°$ and pistoning (translating) over a range of at least $+/-15$ microns (at least one-half wavelength in either direction) piston at a rate of at least 1 KHz (<1 millisecond). Further, the MEMS MMA must have a sufficient number of mirrors, mirror size/resolution, fill factor, range of motion, response time, response accuracy and uniformity across the array.

Figure 1A:
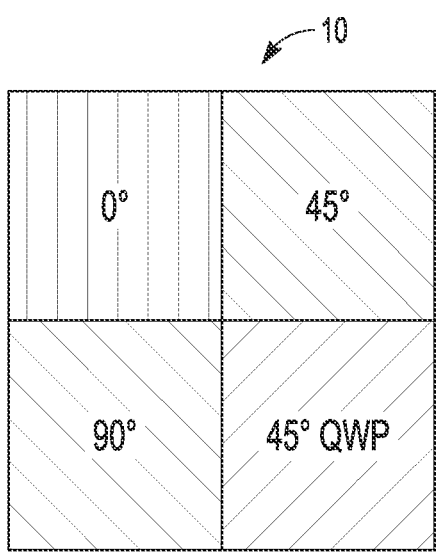
FIGS. 1A and 1B, as described above, are illustrations of four different polarizers to filter and polarize light from which to extract Stokes parameters and a polarimetric image of an aircraft.
Figure 1B:
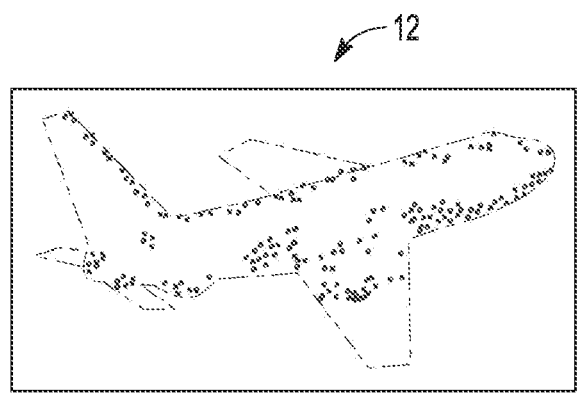

One such MEMS MMA is described in U.S. Pat. No. 10,444,492 entitled "Flexure-Based, Tip-Tilt-Piston Actuation Micro-Array", which is hereby incorporated by reference. As shown in FIGS. 1-3 of the '492 patent this MEMS MMA uses flexures 154 to support each mirror 152 at three fulcrum points (or vertices) of an equilateral triangle. The three different pairs of fulcrum points define three axes at 60 degrees to one another in the XY plane. Each mirror pivots about each axis in response to actuators 156 to produce tip, tilt and piston in the XYZ space. This MEMS MMA is currently being commercialized by Bright Silicon technologies for "digitally controlling light."

Figure 4A:
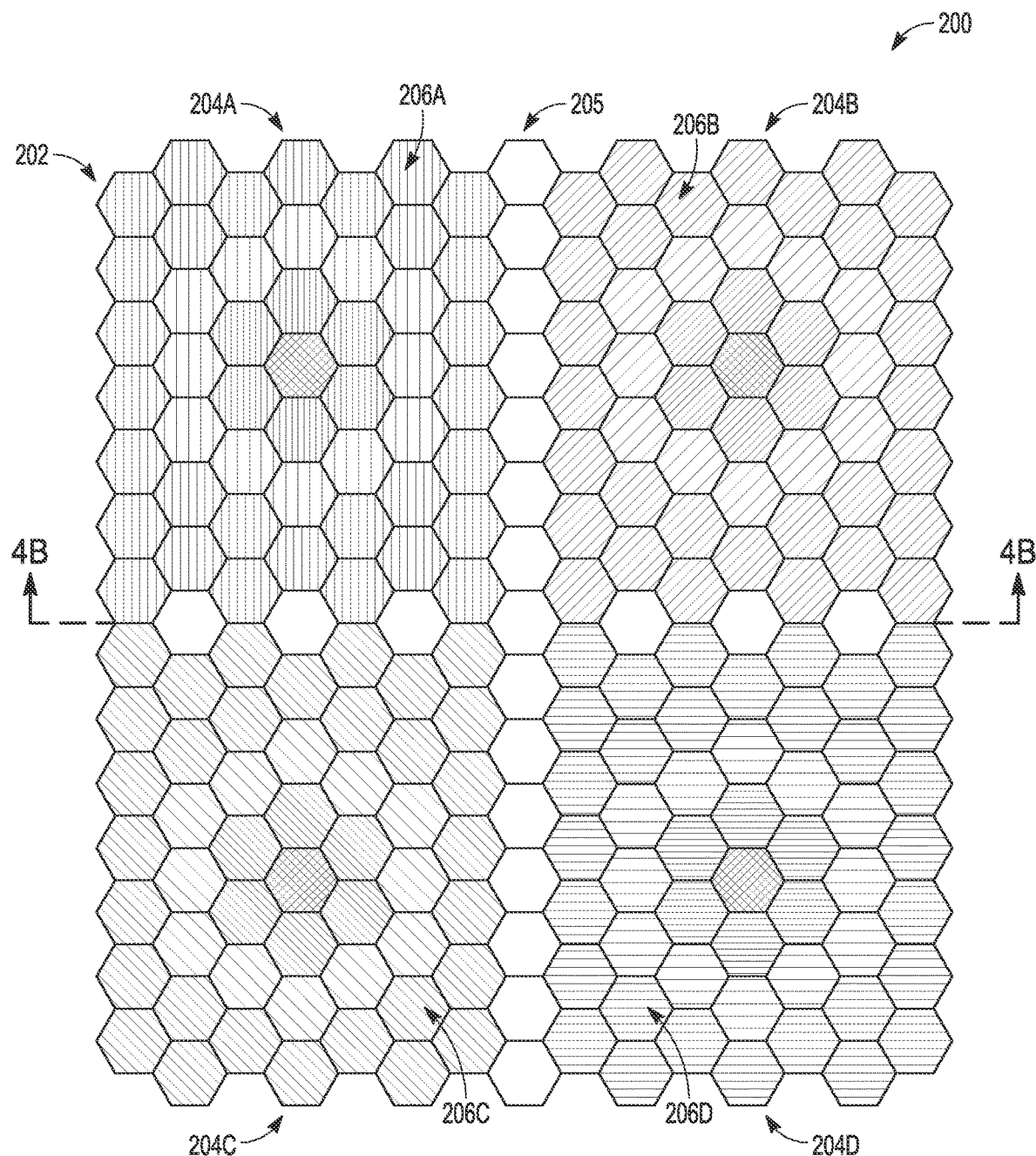
FIGS. 4A and 4B are illustrations of tipping and tilting the mirrors such that polarized light from each quadrant of the MEMS MMA is focused onto a different portion of the FPA.
Figure 4B:
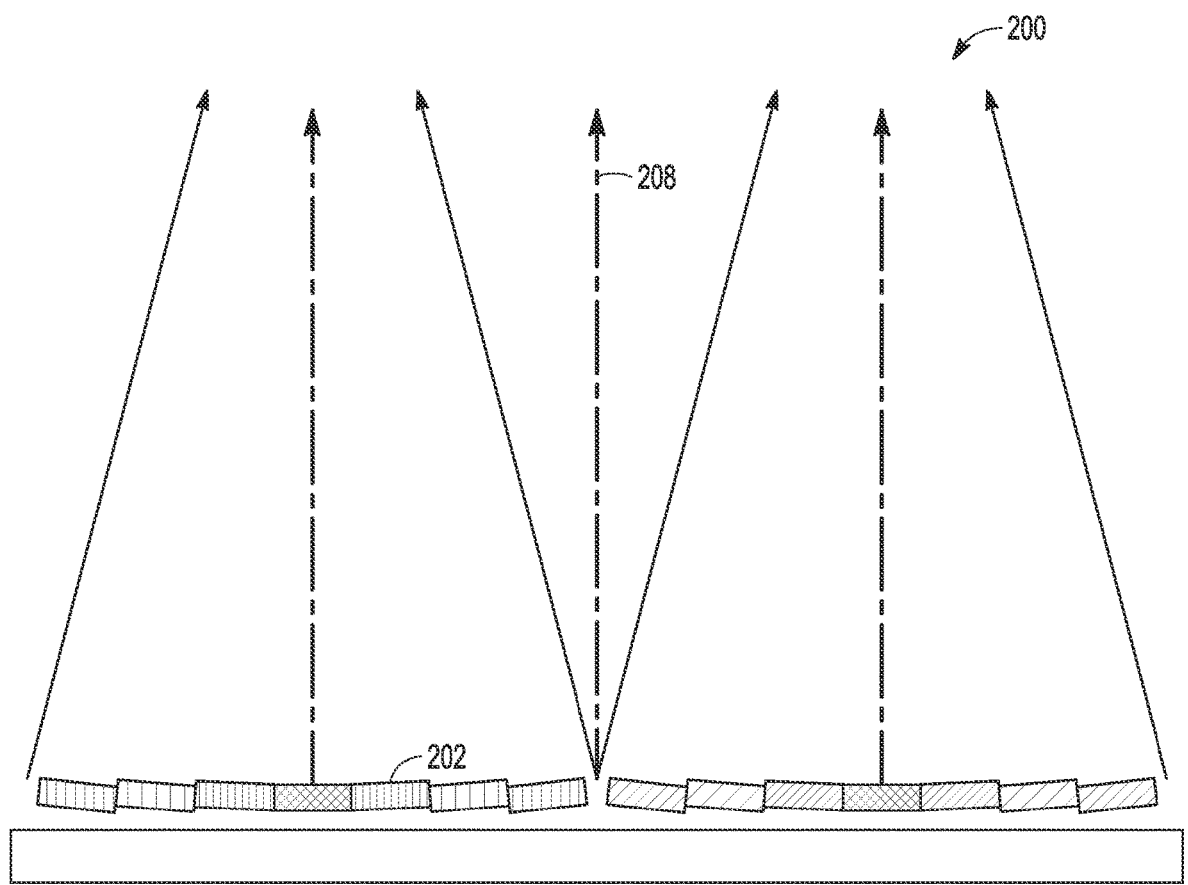

Referring now to FIGS. 4A and 4B, a MEMS MMA 200 includes a plurality of mirrors 202 each having independent tip, tilt and piston capability. MEMS MMA 200 is segmented into four quadrants 204a, 204b, 204c and 204d that are separated by lines of inactive mirrors 205. The mirrors 202 in include quadrants 204a, 204b, 204c and 204d include polarizers 206a, 206b, 206c and 206d, respectively, (e.g. a dielectric coating or wire grid array configured to impart a linear polarization of a particular angular value and in one case a QWP) that impart polarizations P0, P1, P2 and P3. All of the mirrors in a given quadrant impart the same polarization. Mirrors in different quadrants impart different polarizations. In each quadrant, the mirrors are tipped, tilted and pistoned to both focus and steer the reflected and polarized light at specified steering angles with respect to a system optical axis 208 to a different portion of the FPA.

Figure 5A:
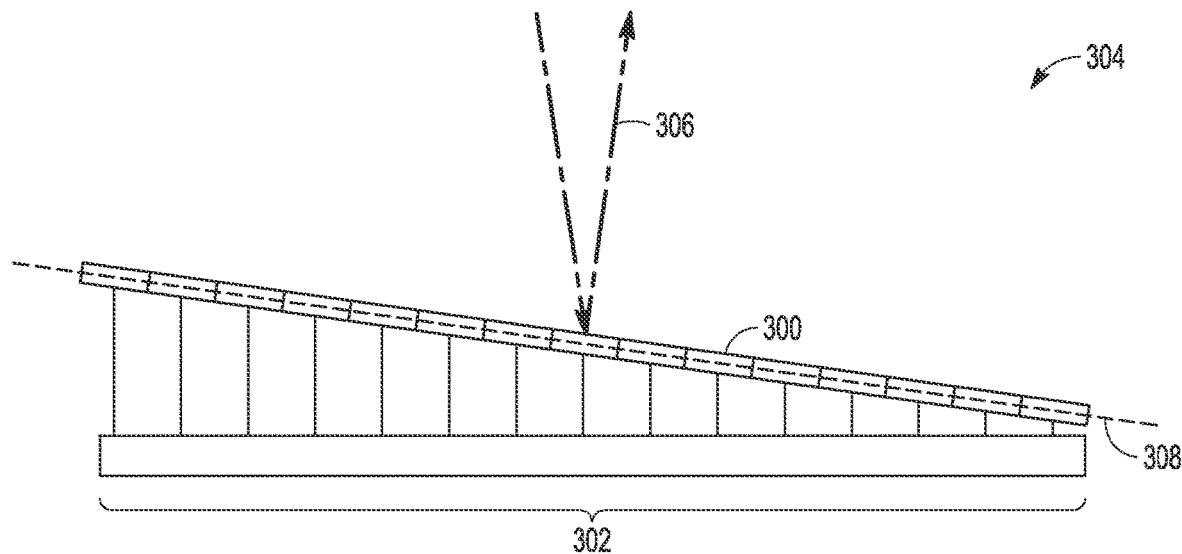
FIGS. 5A and 5B are illustrations of using piston to smooth discontinuities between adjacent mirrors to steer light from a segment of the MEMS MMA and to correct aberrations in the wavefront of the component polarization image, respectively.
Figure 5B:
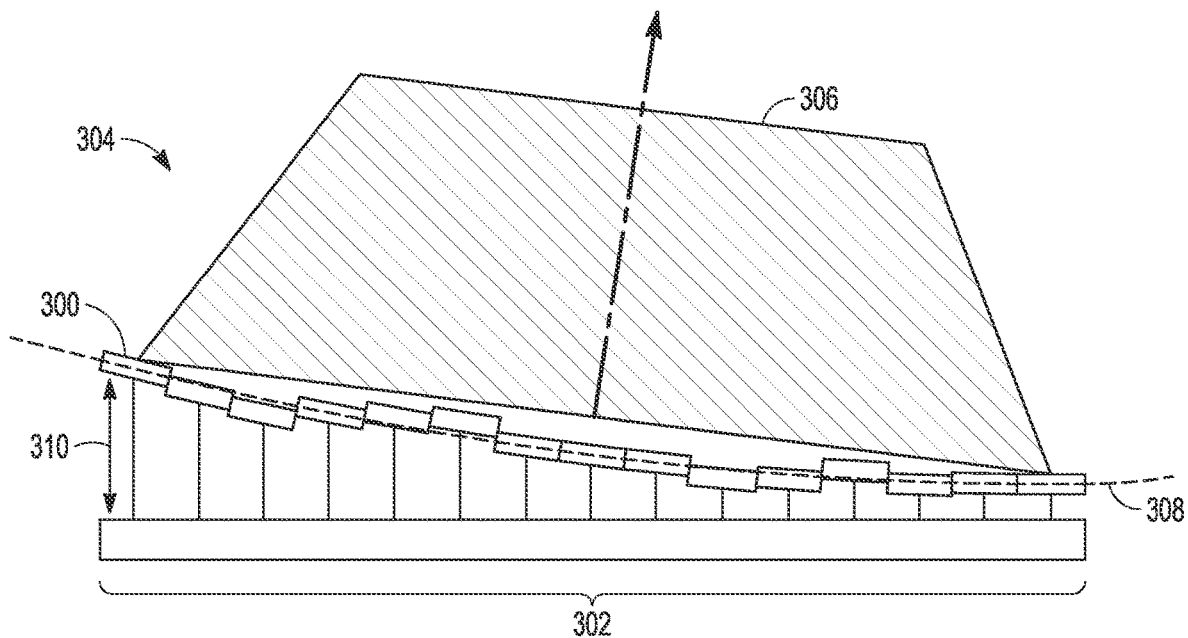

As shown in FIG. 5A, mirrors 300 in a given section 302 of a MEMS MMA 304 are tipped/tilted at nominally the same angle to steer polarized light 306 to a corresponding portion of the FPA. The mirrors are pistoned to remove discontinuities between adjacent mirrors 300 to approximate a single mirror surface 308 to steer the polarized light. As shown in FIG. 5B, the mirrors 300 have been driven with a dynamic piston component 310 to correct for aberrations caused by atmospheric distortion, heating or some other time-varying effect.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An image polarimeter, comprising:
   an image forming system configured to collect light to form an image of a scene;
   a pixelated optical detector;
   a Micro-Electro-Mechanical System (MEMS) Micro-Mirror Array (MMA) positioned at or near an aperture stop of the image forming system, said MEMS MMA comprising a plurality of mirrors responsive to command signals to at least tip and tilt about first and second axes, respectively, said MEMS MMA segmented into two or more segments with each segment including a plurality of mirrors, the mirrors in a given segment having polarizers that impart the same polarization, the polarizers in the two or more segments imparting different polarizations P0, P1, . . . , said MEMS MMA responsive to command signals to tip and tilt the mirrors in the respective segments to reflect and steer polarized light having at least two different polarizations at respective steering angles to respective non-overlapping portions of the pixelated optical detector;
   a focusing element configured to focus the polarized light to form two or more component polarized images I0, I1, . . . of the same image of the scene on the respective portions of the optical detector; and
   a MEMS MMA controller configured to generate the command signals to drive the MEMS MMA.

2. The image polarimeter of claim 1, wherein the pixelated optical detector simultaneously reads out the two or more component polarized images I0, I1, . . . in a single frame at a frame rate, wherein each frame includes an imaging period in which the component polarized images I0, I1, . . . are detected and a dead period, wherein the mirrors are only tipped and tilted during the dead period and are fixed during the imaging period.

3. The image polarimeter of claim 1, wherein at least one of the polarizers P0, P1, . . . includes a quarter-wave plate (QWP).

4. The image polarimeter of claim 1, wherein the polarizer comprises a dielectric coating or a wire grid array configured to impart a linear polarization of a particular angular value.

5. The image polarimeter of claim 1, wherein the focusing element is provided through actuation of the mirrors, which are responsive to command signals to tip and tilt to focus and steer the polarized light to form the component polarized images I0, I1, . . . on the respective non-overlapping portions of the optical detector.

6. The image polarimeter of claim 1, wherein the mirrors piston in translation along a third axis, wherein the mirrors are responsive to command signals to piston to reduce aberrations in the component polarized images I0, I1, . . . .

7. The image polarimeter of claim 6, further comprising a processor configures to (a) compute a nominal fixed piston for each said mirror in each segment to reduce aberrations for a fixed steering angle and a fixed focus to steer and focus the component polarized images onto the detector and (b) process the component polarized images to compute a dynamic piston for each said mirror in each segment to improve the quality of the component polarized images, wherein said processor provides the nominal fixed piston and dynamic piston for each said mirror to the MEMS MMA controller to generate command signals.

8. The image polarimeter of claim 1, wherein the MEMS MMA is segmented into 4 segments in which the mirrors have polarizers that impart different polarizations P0, P1, P2 and P3 in the different segments to produce four component polarized images I0, I1, I2 and I3, wherein polarizations P0, P1, P2 and P3 are configured to derive Stokes Parameters S0, S1, S2 and S3 from the four component polarized images I0, I1, I2 and I3.

9. The image polarimeter of claim 8, where P0=0 degrees, P1=45 degrees, P2=90 degrees and P3=QWP45 degrees.

10. A polarized imaging system, comprising:
    an image forming system configured to collect light to form an image of a scene;
    a pixelated optical detector;
    a Micro-Electro-Mechanical System (MEMS) Micro-Mirror Array (MMA) positioned at or near an aperture stop of the image forming system, said MEMS MMA comprising a plurality of mirrors responsive to command signals to at least tip and tilt about first and second axes, respectively, and to piston in translation along a third axis in three degrees-of-freedom (3DOF), said MEMS MMA segmented into two or more segments with each segment including a plurality of mirrors, the mirrors in a given segment having polarizers that impart the same polarization, the polarizers in different segments imparting different polarizations P0, P1, . . . , said MEMS MMA responsive to command signals to tip and tilt the mirrors in the respective segments to reflect, focus and steer polarized light having at least two polarizations P0, P1, . . . , at respective steering angles to form component polarized images I0, I1, . . . of the same image of the scene on respective non-overlapping portions of the optical detector and responsive to command signals to independently piston the mirrors to reduce aberrations in the component polarized images I0, I1, . . . ; and
    a MEMS MMA controller configured to generate the command signals to drive the MEMS MMA.

11. The image polarimeter of claim 10, wherein the pixelated optical detector simultaneously reads out the two or more component polarized images I0, I1, . . . in a single frame at a frame rate, wherein each frame includes an imaging period in which the component polarized images I0, I1, . . . are detected and a dead period, wherein the mirrors are only tipped, tilted and pistoned during the dead period and are fixed during the imaging period.

12. The image polarimeter of claim 11, wherein the MEMS MMA is segmented into 4 segments in which the mirrors have polarizers that impart different polarizations P0, P1, P2 and P3 in the different segments to produce four component polarized images I0, I1, I2 and I3, wherein polarizations P0, P1, P2 and P3 are configured to derive Stokes Parameters S0, S1, S2 and S3 from the four component polarized images I0, I1, I2 and I3.

13. The image polarimeter of claim 11, further comprising a processor configures to (a) compute a nominal fixed piston for each said mirror in each segment to reduce aberrations for a fixed steering angle and a fixed focus to steer and focus the component polarized images onto the detector and (b) process the component polarized images to compute a dynamic piston for each said mirror in each segment to improve the quality of the component polarized images.

14. An image polarimeter, comprising:
an image forming system configured to collect light to form an image of a scene;
a pixelated optical detector;
a Micro-Electro-Mechanical System (MEMS) Micro-Mirror Array (MMA) positioned at or near an aperture stop of the image forming system, said MEMS MMA comprising a plurality of mirrors responsive to command signals to at least tip and tilt about first and second axes, respectively, said MEMS MMA segmented into four segments with each segment including a plurality of mirrors, the mirrors in a given segment having polarizers that impart the same polarization, the polarizers in the four segments imparting different polarizations P0, P1, P2 and P3, said MEMS MMA responsive to command signals to tip and tilt the mirrors in the respective segments to reflect, focus and steer polarized light having four polarizations P0, P1, P2 and P3 at respective steering angles to form component polarized images I0, I1, I2 and I3 of the same image of the scene on respective non-overlapping portions of the optical detector, wherein polarizations P0, P1, P2 and P3 are configured such that Stokes Parameters S0, S1, S2 and S3 are derivable from the four component polarized images I0, I1, I2 and I3; and
a MEMS MMA controller configured to generate the command signals to drive the MEMS MMA.

15. The image polarimeter of claim 14, where P0=0 degrees, P1=45 degrees, P2=90 degrees and P3=QWP45 degrees.

16. The image polarimeter of claim 14, wherein the pixelated optical detector simultaneously reads out the four component polarized images I0, I1, I2 and I3 in a single frame at a frame rate, wherein each frame includes an imaging period in which the component polarized images I0, I1, I2 and I3 are detected and a dead period, wherein the mirrors are only tipped and tilted during the dead period and are fixed during the imaging period.

17. The image polarimeter of claim 14, wherein the mirrors piston in translation along a third axis, wherein the mirrors are responsive to command signals to piston to reduce aberrations in the component polarized images I0, I1, I2 and I3.

18. The image polarimeter of claim 14, wherein the mirrors in each segment are responsive to command signals to piston to reduce aberrations for a fixed steering angle and a fixed focus to steer and focus the component polarized images onto the detector.

19. The image polarimeter of claim 14, wherein the mirrors in each segment are responsive to command signals derived from the detected component polarized images to dynamically reduce aberrations and improve the quality of subsequent the component polarized images.

20. The image polarimeter of claim 14, further comprising a processor configures to (a) compute a nominal fixed piston for each said mirror in each segment to reduce aberrations for a fixed steering angle and a fixed focus to steer and focus the component polarized images onto the detector and (b) process the component polarized images to compute a dynamic piston for each said mirror in each segment to improve the quality of the component polarized images, wherein said processor provides the nominal fixed piston and dynamic piston for each said mirror to the MEMS MMA controller to generate command signals.

* * * * *

UNITED STATES PATENT AND TRADEMARK OFFICE
CERTIFICATE OF CORRECTION

PATENT NO. : 12,259,277 B2  
APPLICATION NO. : 17/479927  
DATED : March 25, 2025  
INVENTOR(S) : Rogala et al.

Page 1 of 1

It is certified that error appears in the above-identified patent and that said Letters Patent is hereby corrected as shown below:

In the Drawings

Sheet 2 of 6, Fig. 2A, and on the Title Page, the illustrative print figure, reference numeral 120C (First Occurrence), Line 1, delete "120C" and insert --120B-- therefor In the Specification In Column 4, Line 64, delete "(DOLLP)" and insert --(DOLP)-- therefor In Column 6, Line 36, delete "'492" and insert --'492-- therefor In the Claims In Column 8, Line 8, in Claim 8, delete "4segments" and insert --4 segments-- therefor Signed and Sealed this  
Twentieth Day of January, 2026

John A. Squires  
*Director of the United States Patent and Trademark Office*